United States Patent [19]

McMahon

[11] Patent Number: 4,730,301

[45] Date of Patent: Mar. 8, 1988

[54] WAVELENGTH MULTIPLEXED OPTICAL COMMUNICATIONS SYSTEM AND METHOD

[75] Inventor: Donald H. McMahon, Carlisle, Mass.

[73] Assignee: Polaroid Corporation, Cambridge, Mass.

[21] Appl. No.: 811,775

[22] Filed: Dec. 20, 1985

[51] Int. Cl.⁴ .............................................. H04B 9/00
[52] U.S. Cl. .......................................... 370/2; 370/3; 455/607; 455/616; 455/617
[58] Field of Search ............... 455/606, 616, 607, 605; 370/2, 3; 350/96.16; 372/94, 96, 105, 32

[56] References Cited

FOREIGN PATENT DOCUMENTS 58-12449   1/1983  Japan .
58-117738  7/1983  Japan .
58-123246  7/1983  Japan .
60-158742  8/1985  Japan .

OTHER PUBLICATIONS

AT&T Technical Digest, No. 75, Sep. 1984, "Subscriber Loop Architecture", Cheng et al.

*Primary Examiner*—Robert L. Griffin
*Assistant Examiner*—Leslie Van Beek
*Attorney, Agent, or Firm*—Francis J. Caufield

[57] ABSTRACT

An optical fiber communications system includes a closed loop birefringent optical fiber bus for supporting optical energy propagated in a first and a second orthogonal polarization state. An optical energy source introduces a fixed frequency system wide carrier onto the optical fiber bus in a first polarization state for propagation in a first direction. Terminal devices coupled to the optical fiber bus include a bus tap resonator for removing a portion of the system wide carrier light and, in addition to modulating the removed light, effecting a frequency shift to a side frequency and effecting a state shift from the first to the other polarization state, and returning the information bearing optical energy to the optical fiber bus for propagation in a direction opposite to the first direction. A receiving device includes a bus tap resonator for removing a portion of the light from the bus and effecting demodulation to recover the information bearing signal.

22 Claims, 10 Drawing Figures

WAVELENGTH MULTIPLEXED OPTICAL COMMUNICATIONS SYSTEM AND METHOD

BACKGROUND OF THE INVENTION

The present invention relates to communication systems. More particularly, it concerns optical communications systems in which a plurality of terminal devices communicate with one another over a common optical bus.

In many types of communications networks, it is common for the terminal devices to introduce information bearing signals onto a network bus by modulating a locally available carrier source. In the electrical domain, stable and highly accurate carrier sources are available that can be tuned from one frequency to another to allow frequency division multiplexed networks. In optical systems, however, the traditional carrier sources, viz., light emitting diodes and laser diodes, have inherent limitations which mitigate against high density frequency division multiplexed networks. As is known, laser diodes are difficult to tune from one wavelength to another and to wavelength stabilize, in part, because of their temperature sensitivity, and light emitting diodes are generally considered low power devices having a relatively wide spectral output. While frequency stabilization schemes are known, the many variables involved make the tuning of the local light source from one frequency to another difficult. While relatively stable light sources, such as gas lasers, are available, their comparatively high cost, physical size, power supply requirements, and the attendant difficulty of modulating their output makes them unattractive for use in each terminal device in the network.

As can be appreciated, any optical communications system which provides high density frequency division multiplexing without using a local carrier source in each terminal device possesses significant cost and performance advantages over prior systems.

SUMMARY OF THE INVENTION

An optical fiber communications system in accordance with the present invention includes an optical fiber pathway defined by an optical fiber bus which supports the propagation of light in first and second characteristic states. A central system wide carrier source injects light in one of the two characteristic states into the optical fiber bus at a master frequency for propagation throughout the system. A plurality of terminal devices are coupled to the optical fiber bus for communication with one another by removing a portion of the light provided by the central carrier source, effecting a shift to the other characteristic state, and modulating the light for return to the optical fiber bus as state converted information bearing light for propagation to other terminal devices. Receiving devices remove a portion of the information bearing light propagated in the other characteristic state and effect demodulation to recover the original signal content.

In the preferred embodiment, the optical pathway is defined by a birefringent optical fiber bus formed into a closed loop. The system wide carrier source injects light into the optical fiber bus in a first polarization mode or state for propagation in a first direction about the closed loop. The terminal devices remove a portion of the light propagated in the first polarization state and effect a shift to the other polarization state and modulate the light for return to the optical bus for propagation in a direction opposite to the direction of the light propagated in the first polarization state. Additionally, the light returned to the system bus is desirably frequency shifted from the frequency of the light provided by the system wide carrier source.

The system wide carrier source includes a frequency stable source of light, such as a gas laser, which introduces light into a resonant cavity structure that preferentially supports wavelengths of the system wide master frequency in the polarization state selected for the system wide carrier. A frequency controller coupled to the resonant cavity structure functions to provide a frequency deviation error to an amplifier for driving a thermal energy generator which introduces thermal energy into the resonant cavity structure to control its resonant characteristics to lock the resonant cavity to the frequency of the system wide carrier to maximize energy transfer into the system bus.

Terminal devices which include a transmitter remove a portion of the system wide carrier light, effect a frequency shift to an adjacent side frequency of the master frequency, effect a shift to the orthogonal polarization state, and modulate the light for return as a modulated, frequency shifted and state switched signal into the optical bus for propagation in a direction opposite to the direction of the system wide carrier. Each transmitter includes a resonant cavity structure which removes a portion of the system wide carrier from the optical bus and passes the removed light through an electro-optical modulator for modulation and return to the optical bus as a frequency shifted, direction reversed, and state switched modulated signal. The electro-optical modulator can be defined by an oriented electro-optical crystal excited by an electrical signal which is effective to modulate the light passed through the crystal. The resonant cavity structure is locked to the master frequency by a control loop which introduces thermal energy into the resonant cavity structure to alter its resonant characteristics and tunes the resonant cavity to the master frequency of the system wide carrier.

In terminal devices which include a receive function, a resonant cavity structure removes a portion of the light propagated in the orthogonal state from the optical fiber bus and presents the removed signal to a demodulator for recovery of the information content. Receiving devices, as in the case of the transmitting devices, are locked to the frequency of the system wide carrier by a control loop which introduces thermal energy into the resonant cavity structure to alter its resonant characteristics.

The resonant cavity structures used in the devices which are coupled to the optical fiber bus can take the form of integrated tap resonators defined by an anisotropic material, such as lithium niobate, in which light guiding channels are created by appropriate doping with a titanium or equivalent dopant.

An optical fiber communication system in accordance with the present invention provides for a system in which a highly accurate frequency source provides a system wide carrier sufficient to accommodate the needs of the entire communication system to thereby dispense with a requirement for local frequency sources at each terminal device.

A principal objective of the present invention is, therefore, the provision of an improved optical fiber communications system by which various terminal devices within the system may readily communicate with one another. Other objects and further scope of applicability of the present invention will become apparent from the detailed description to follow, taken in conjunction with the accompanying drawings, in which like parts are designated by like reference characters.

DESCRIPTION OF THE PREFERRED EMBODIMENT

Figure 1:
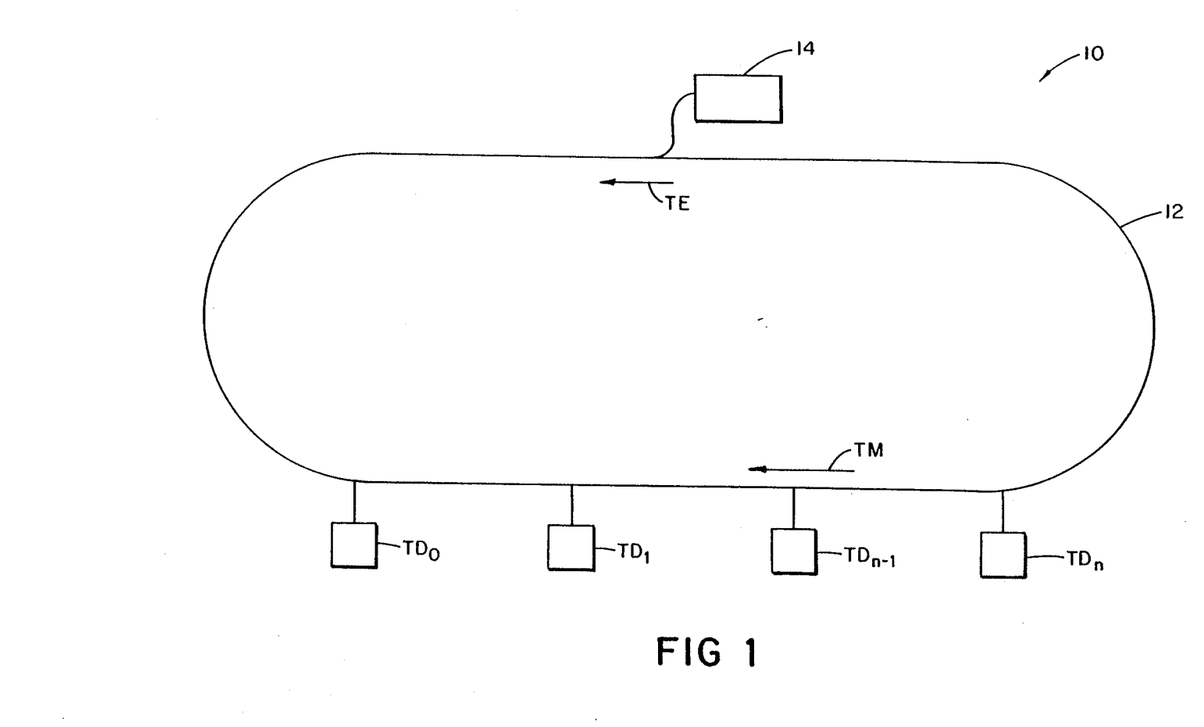
FIG. 1 is an overall schematic diagram of an optical fiber communications system in accordance with the present invention illustrating a closed optical bus with various terminal devices coupled to the bus.

An optical fiber communications system in accordance with the present invention is illustrated in schematic form in FIG. 1 and designated generally therein by the reference character 10. As shown, the system 10 is preferably configured as a closed loop or ring defined by a birefringent single mode optical fiber bus 12, which is designed to propagate optical energy in two mutually exclusive and orthogonal polarization states, designated herein as the TE and TM states. Other suitable system configurations include the star system in which all communication channels return to a common node for retransmission to an intended destination. Single mode optical fibers having birefringent characteristics can be obtained by using nonsymmetrical core geometries and by core stressing arrangements in which stresses of different quantitative magnitudes are provided along orthogonal major and minor axes to induce orthogonal propagation velocity differences. Such stressed core fibers can be obtained, for example, through the use of noncircular core configurations with optical materials having different coefficients of thermal expansion. The system 10 includes a system wide carrier source 14 and a plurality of terminal devices $TD_0$, $TD_1$, ..., $TD_{n-1}$, $TD_n$ which are coupled to the optical fiber bus 12 for communication with one another. The power output of the system wide carrier source 14 is such that it will accommodate the power requirements of all terminal devices $TD_n$ to be connected to the bus 12 as well as fiber attenuation and coupling losses. The system wide carrier source 14, as described more fully below, is effective to generate a stable source light at a preferred master frequency in one of the two polarization states or modes, i.e., the TE state in the context of the preferred embodiment, and inject or otherwise introduce the TE state light into the optical bus 12 for propagation in one direction, for example, the counterclockwise direction as shown in FIG. 1. Each of the terminal devices $TD_n$ is designed to remove a portion of the system wide TE state carrier light and modulate, state shift, and frequency shift the light for return to the bus 12 as TM state light travelling in the opposite direction, that is, the clockwise direction in the case of FIG. 1. The information bearing TM state light is supported by the birefringent optical bus and propagated in the clockwise direction with each terminal device $TD_n$ connected to the bus sensing the TM state information bearing light and responding when appropriately addressed. The addressed terminal device $TD_n$ removes a portion of the TM state information bearing light and demodulates the light to recover the information content for utilization.

Figure 2:
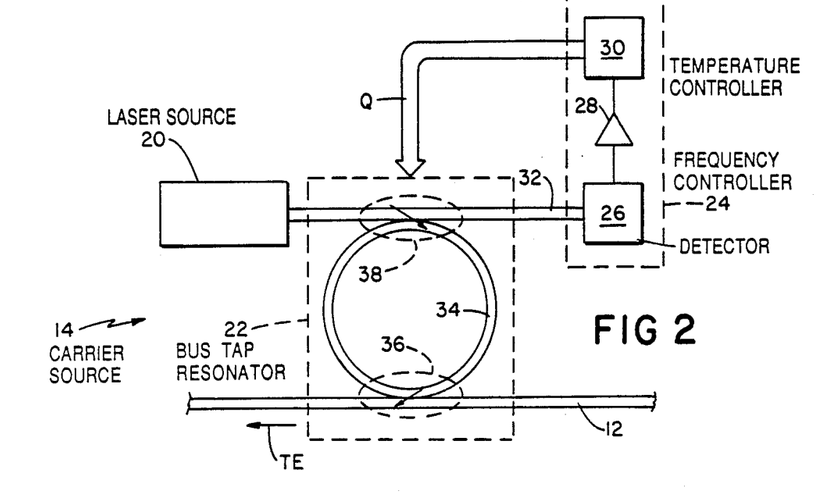
FIG. 2 is a schematic representation of a system wide carrier source for introducing an optical carrier into the communication system of FIG. 1.

An exemplary system wide carrier source 14 in accordance with the present invention is illustrated in FIG. 2 and includes a light source in the form of a frequency and amplitude stabilized laser 20, a bus tap resonator 22, and a frequency controller 24 including a detector 26, a drive amplifier 28, and a thermal energy source 30.

The laser source 20 has an output which defines the master frequency for the system 10 and a power output sufficiently high to support all terminal devices $TD_n$ to be coupled into the system 10. The laser source 20 can take the form of a helium-neon laser operating characteristically at 1152.3 nm. As can be appreciated, other gas or gas mixture lasers or suitably stabilized semiconductor lasers operating at a preferred frequency are suitable, in general, wavelengths of between 0.8 and 1.5 microns being preferred. The output of the laser source 20 is butt coupled into a transfer link 32 which presents the optical energy to both the bus tap resonator 22 and the detector 26.

The birefringent bus tap resonator 22 includes a resonant cavity loop 34 which is laterally coupled to the optical bus 12 through a lateral coupling 36 and also laterally coupled to the transfer link 32 through another lateral coupling 38. As indicated by the directional arrows associated with each lateral couple, 36 and 38, light energy introduced into the transfer link 32 from the laser source 20 is laterally transferred into the resonant cavity loop 34 through the lateral coupling 38 and from the resonant cavity loop 34 through the lateral coupling 36 into the optical bus 12 for propagation in the direction indicated, that is, to the left in FIG. 2 or counterclockwise in the context of the system illustrated in FIG. 1. The lateral couplings 36 and 38 are of the type that preserve the polarization state of the transferred light, that is, the TE state light in the transfer link 32 will excite the corresponding TE state in the resonant cavity loop 34. The bus tap resonator 22 functions, in part, to buffer or decouple the output of the laser source 20 so changes in optical loading on the optical bus 12 will not be reflected back to or otherwise presented to the laser source 20 to adversely affect the frequency of the laser source 20. If desired, additional isolation in the form of a magnetic isolator or a functional equivalent can be provided at the output of the laser source 20. The resonant cavity loop 34 has an effective optical length which will resonantly support those wavelengths that are an integral number of its effective optical length, including the master frequency provided by the laser source 20.

Figure 2A:
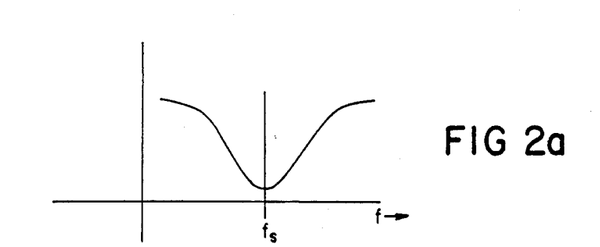
FIG. 2a is a graphical representation of the output of a detector of the system wide carrier source illustrated in FIG. 2.

The light introduced into the transfer link 32 by the laser source 20 is also provided to the detector 26. When the resonant characteristics of the bus tap resonator 22 are coincident with the frequency of the laser source 20, the maximum amount of light will be transferred through the lateral coupling 38 into the resonant cavity loop 34, leaving a minimum of light in the transfer link 32. Conversely, when the resonant characteristics of the bus tap resonator 22 are not coincident with the frequency of the laser source 20, less energy will be transferred through the lateral coupling 38 to the resonant cavity loop 34, leaving more energy in the transfer link 32. The detector 26 measures the light exiting the transfer link 32 and provides a frequency deviation output, graphically illustrated in FIG. 2a, in which the minima represents an optimally tuned situation with maximum energy transfer from the transfer link 32 into the resonant cavity loop 34 and the adjacent inclining slopes and maximas represents out of tune conditions. The frequency deviation error signal is provided to the drive amplifier 28 which, in turn, provides its output to the temperature controller 30 which is in a heat conducting relationship, as symbolically represented by the arrow Q, with the bus tap resonator 22. Depending upon the magnitude of the frequency deviation error signal, greater or lesser quantities of thermal energy are introduced into the bus tap resonator 22 to alter the resonant characteristics of the resonant cavity loop 34 by changing its physical characteristics. As can be appreciated, the operation of the detector 26, the amplifier 28, and the temperature controller 30 define a control loop that functions to cause the bus tap resonator 22 to lock to and preferentially support light energy at the preselected system wide carrier frequency. In the preferred embodiment, the control loop functions as a D.C. feedback loop to lock a resonant mode of the bus tap resonator 22 to the side of the system wide carrier frequency with the offset being a function of the loop gain. While a D.C. feedback loop is preferred, it is possible to use A.C. feedback techniques for dithering the frequency of the system wide carrier about its average value as described in applicant's commonly assigned U.S. patent application Ser. No. 783,436, filed Nov. 3, 1985, and entitled OPTICAL COMMUNICATION SYSTEM EMPLOYING FREQUENCY REFERENCE. The response time of the frequency controller 24 should be commensurate with the heat transfer rates to provide accurate and stable control. The system wide carrier source 14 thus provides a stabilized, fixed frequency, system wide carrier for utilization by the various terminal devices $TD_n$ within the system 10.

Figure 3:
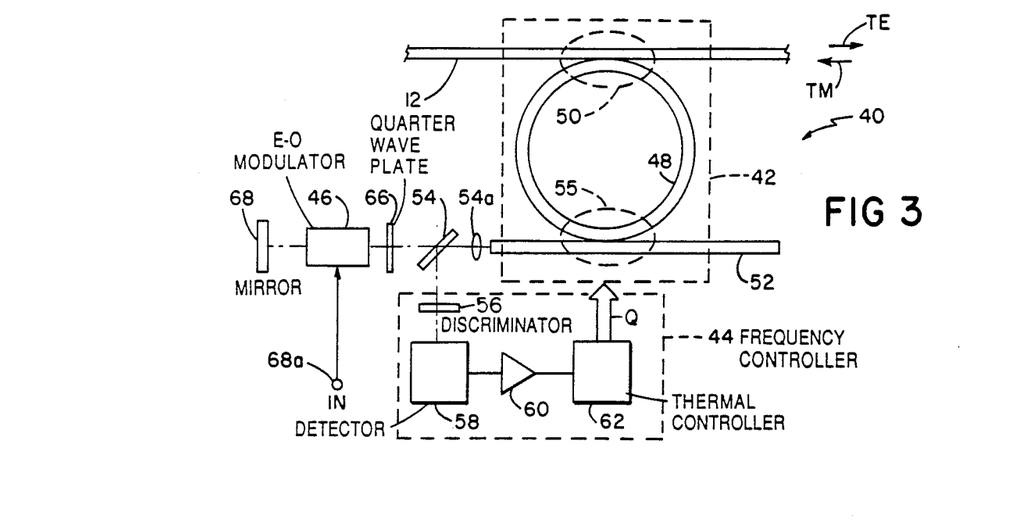
FIG. 3 is a schematic representation of a transmitting terminal device for introducing signal modulated light energy into the communication system.

Each of the terminal devices $TD_n$ preferably includes both transmitting and receiving functions although single function transmitting and receiving terminal devices can be utilized. An exemplary architecture for a transmitting terminal device $TD_n$ is illustrated in FIG. 3 and is designated generally therein by the reference character 40. The transmitter 40 includes a bus tap resonator structure 42, a resonant frequency controller, generally designated as 44, and an electro-optic modulator 46 which functions to frequency shift, modulate and state shift a portion of the TE state light removed from the optical bus 12.

The bus tap resonator 42 includes a resonant cavity loop 48 having an effective optical length that supports optical energy at various frequencies or modes including frequencies which are adjacent to and displaced relative to the system wide carrier master frequency. The resonant cavity loop 48 is laterally coupled to the optical bus 12 through a lateral coupling 50 with a portion of the TE state light circulated in the bus 12 transferred through the lateral coupling 50 into the resonant cavity loop 48. The removed light is resonantly supported and laterally transferred through a lateral coupling 55 into a transfer link 52. A portion of the light from the transfer link 52 is presented through a lens 54a to a beam splitter 54 which passes a portion of the TE state light into the electrooptic modulator 46, which functions as described below, and reflects another portion into the frequency controller 44. The TE state light presented to the frequency controller 44 is passed through a TE state discriminator 56 which discriminates against any TM state communication components that may be present. The desired TE state light is presented to a detector 58 which produces an output that increases in proportion to the difference between the frequency of the sensed TE state optical energy and the resonant characteristics of the bus tap resonator 42 in a manner analagous to that described above. The output of the detector 58 is presented to a drive amplifier 60 which drives a thermal controller 62 to generate and transfer thermal energy to the bus tap resonator 42 to alter the physical characteristics of the bus tap resonator and the effective optical length of the resonant cavity loop 48. The frequency controller 44 is thus effective to control the resonant characteristics of the bus tap resonator 42 and lock the bus tap resonator to the system wide carrier frequency at one of its many resonant frequencies or modes.

The TE state light is also passed from the transfer link 52 through the lens 54a and the beam splitter 54, a one quarter wave plate 66, and through the electro-optic modulator 46 to a mirror 68 or a functionally equivalent device which returns the light through the electro-optic modulator 46, the quarter wave plate 66, the beam splitter 54, and the lens 54a into the transfer link 52. As described more fully below in relation to FIG. 6, the electro-optic modulator 46, in addition to modulating the light energy, also effects a shift to the orthogonal TM state and a frequency shift to a communications frequency.

The information to be introduced into the optical bus 12 as modulated TM state light is initially ported through a signal input 68a into the electro-optic modulator 46, which is effective to modulate, state shift, and frequency shift the TE state energy removed from the optical bus 12 and return the energy as modulated TM state and frequency shifted light into the transfer link 52, through the lateral coupling 55 the resonant cavity loop 48, and the lateral coupling 50 into the optical bus 12 for propagation in a direction opposite to the direction of the system wide carrier, that is, to the left in FIG. 3 and clockwise in the context of FIG. 1.

Figure 4:
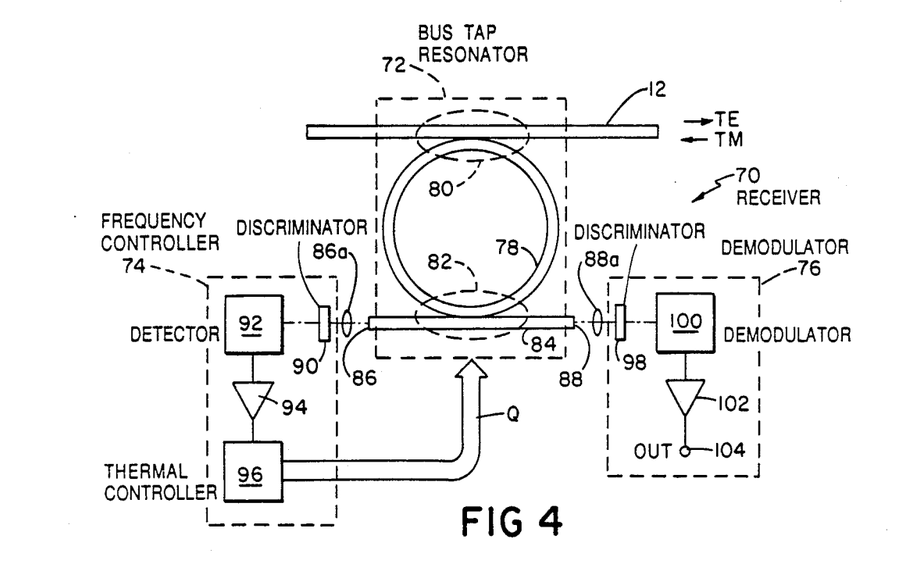
FIG. 4 is a schematic representation of a receiving terminal device for providing a demodulated output signal removed from the optical communication system.

A receiver in accordance with the present invention is illustrated in schematic form in FIG. 4 and designated generally therein by the reference character 70. The receiver includes a bus tap resonator 72, a frequency controller 74, and a demodulator 76. The bus tap resonator 72 includes a resonant cavity loop 78 that has an effective optical length that resonates with the TM state information bearing optical energy as well as the TE state system wide carrier frequency. A portion of the information bearing optical energy is transferred from the optical communications bus 12 through a lateral coupling 80 into the resonant cavity loop 78 and transferred through the lateral coupling 82 into a transfer link 84 which includes an output port 86, on the left in FIG. 4, for directing system wide source TE state light through a lens 86a into the frequency controller 74 and, on the right, an output port 88 for directing the freqency shifted, modulated TM state light through a lens 88a into the demodulator 76.

The frequency controller 74 includes a TE state discriminator 90 that passes only TE state light while suppressing or substantially attenuating TM state optical energy. The TE state optical energy is received by a detector 92 which provides an output to a drive amplifier 94 that drives a thermal controller 96 for introducing thermal energy into the bus tap resonator 72 to affect a change in its physical characteristics to correspondingly alter its frequency characteristics in a manner analogous to that described above for the bus tap resonators of the system wide carrier 14 and the transmitter 40.

The light presented through the output port 88 and the lens 88a is passed through a TM state discriminator 98 with the resulting information bearing TM state light being presented to a demodulator 100 which functions to demodulate the information bearing TM state light and present the recovered signal to an amplifier 102 and an output port 104.

Figure 5:
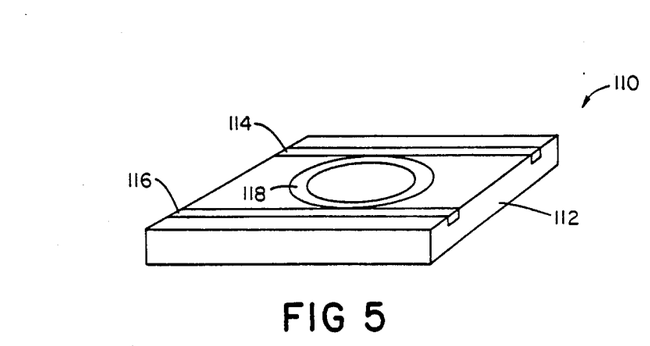
FIG. 5 is an isometric projection of a bus tap resonator used in fabricating the devices illustrated in schematic form in FIGS. 2, 3, and 4.

In the above described embodiment of the system wide carrier source 14, the transmitter 40, and the receiver 70, a resonant structure in the form of a bus tap resonator preferentially supports light propagated in the orthogonal TM and TE states. A suitable birefringent resonant structure is illustrated in FIG. 5 and is designated therein by the reference character 110. The resonant cavity structure 110 is preferably fabricated from a lithium niobate substrate (LiNbO₃), which material is optically anisotropic, having an ordinary ray index of 2.2 and an extraordinary ray index of 2.29, to provide a birefringent velocity difference of approximately 4%. As shown in FIG. 5, spaced linear optical guideways or channels 114 and 116 are created in the substrate 112 along with a continuous resonant cavity loop 118. The light guiding channels 114 and 116 and the loop 118 may be created by diffusing titanium into the lithium niobate substrate. The relationship of the light guiding channels 114 and 116 to the loop 118 is such that birefringent lateral coupling is effected. The initial crystalline orientation of the lithium niobate substrate is selected so that both the ordinary and extraordinary rays are supported within the light guiding channels to correspondingly support both the TE and TM state light. One of the linear channels, for example, the channel 114, is connected to or otherwise coupled to the optical bus 12 while the other of the channels, that is, the channel 116, is used for the functions described above in relation to the operation of the system wide carrier source 14, the transmitter 40, and the receiver 70.

Figure 6:
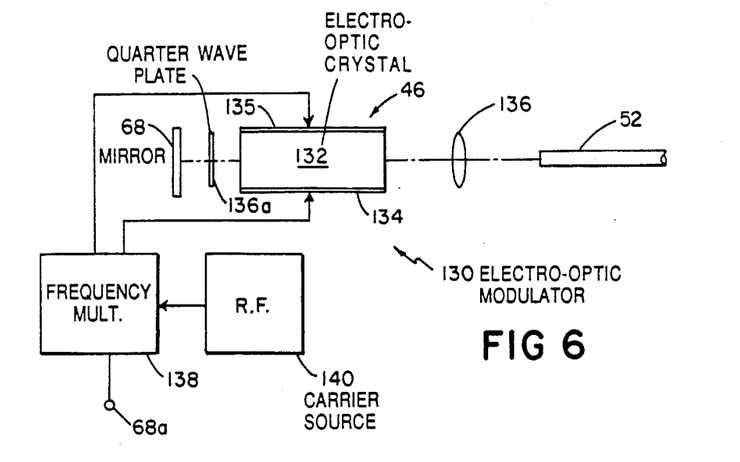
FIG. 6 is a schematic representation of an electrooptical modulator useful for modulating optical energy.

The electro-optic modulator 46 suitable for use in the transmitter 70 of FIG. 4 is shown in greater detail in FIG. 6 and is designated generally by the reference character 130. As shown therein, the electro-optic modulator 130 is defined by an electro-optical crystal 132, for example, lithium niobate, having electrodes 134 and 135 on opposite side faces. Light is introduced into the electro-optic crystal 132 from the transfer link 52 through a collimating lens 136, with the light passing through the electro-optic crystal 132 and a quarter wave plate 136a to the mirror 68. The direction of the light is reversed by the mirror 68 for return through the quarter wave plate 136a, electro-optical crystal 132, and the lens 136 to the transfer link 52. The electrodes 134 and 135 are coupled to the output of a high frequency multiplier 138 which, in turn, accepts a radio frequency carrier (e.g., up to 10 GHz) from a radio frequency carrier source 140 and the information bearing signal through the input 68a. In operation, the information bearing signal, which can take the form of digital pulses, is impressed upon the radio frequency carrier via the multiplier and presented across the electro-optic crystal 132 with the E-field variations exercising the electro-optic crystal 132 in the normal manner such that the two characteristic states of the light energy passing through the electro-optical crystal 132 are modulating and state shifting the energy from the TE to the TM state, and frequency shifting the energy upon its return to the transfer link 52. Additional disclosure relating to TE/TM state conversion and frequency shifting may be found in Johnson, L., Becker, R. et al "Integrated-Optical Channel-Waveguide Frequency Shifter" Lincoln Laboratory, Massachusetts Institute of Technology, Lexington, Mass., and Risk, W. P., Youngquist, G. S., et al "Acousto-optic Birefringent Fiber Frequency Shifters" Edward L. Ginzton Laboratory, Stanford Univ., Calif., the disclosures of which are incorporated herein by reference to the extent necessary to practice the present invention.

Figure 7:
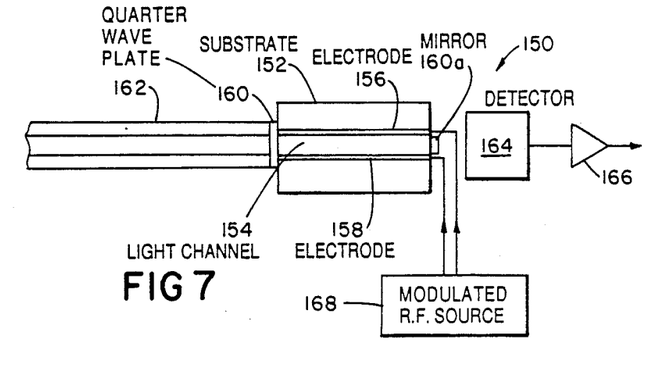
FIG. 7 is a schematic representation of an integrated optical converter and frequency shift modulator.

An integrated optic device 150, as shown in FIG. 7, may be used for TE/TM state conversion and the frequency shifting function. The integrated optic device 150 includes a substrate 152, preferably formed from LiNbO₃, having a light guiding channel 154 formed therein with electrodes 156 and 158 located on adjacent sides of the channel 154. A quarter wave plate 160 or functionally equivalent device is interposed between the end coupled transfer link 162 and the channel 154 and a mirror 160a is located at one end of the channel 154 to return light introduced into the channel 154 from the end coupled transfer link 162. A detector 164 is positioned adjacent the end of the substrate opposite the transfer link 162 and operates in a manner analagous to the detectors described above to provide a frequency deviation error signal to a drive amplifier 166 to drive a temperature controller (not shown in FIG. 7). A modulation signal is provided from a modulated RF source 168 through appropriate conductors to the electrodes 156 and 158. The alignment of the electro-optical crystal 152 is such to support the orthogonal TE and TM modes to allow electrically controllable conversion from the TE to the TM modes.

In the modulator embodiments described above in relationship to FIGS. 6 and 7, TE state light supplied by the system wide carrier source 14 is removed from the bus tap resonator for modulation, state conversion, and frequency shifting prior to return to the bus tap resonator. These functions can be achieved in the bus tap resonator by fabricating the bus tap resonator from a high frequency electrooptic material and incorporating a frequency shift modulator directly into the resonant cavity loop as well as inserting a TE/TM state converter into the loop.

Figure 8A:
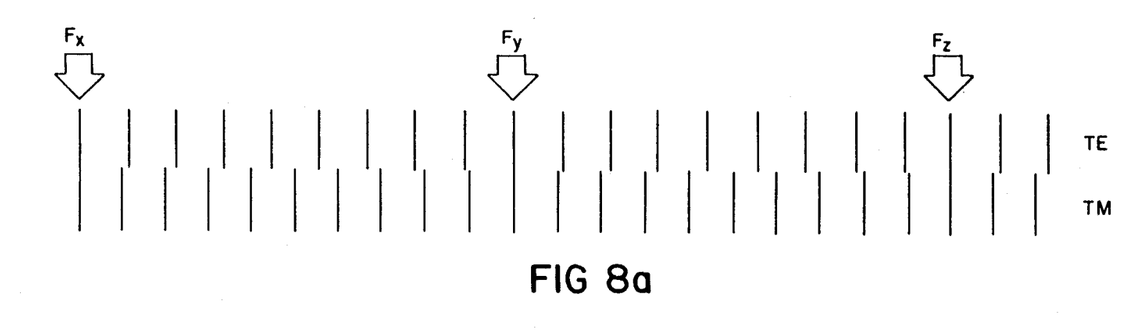
FIG. 8a is a representation of the TE and TM state spectral response at a first temperature for the bus tap resonator of FIG. 5.

In the embodiments described above, the birefringent bus tap resonators are tuned by altering a physical characteristic of the structure that defines the resonant cavity to accordingly change the spacing between the orders of the TE and TM states resonantly supported within the cavity, and, accordingly, the TE state communications frequencies. For example, where TE and TM state light is introduced into a birefringent resonator, one of the states, e.g., the TE state, will have a velocity greater than the other, viz., the TM state. In both cases the resonant cavity loop will resonantly support optical energy of both the TE and TM states at wavelengths that are an integral number of wavelengths of the effective optical length of the cavity, although the spacing between the supported TE and TM orders will be different because of velocity differences caused by the ordinary and extraordinary indices. Accordingly, unique TE state frequencies will be available for the communications functions with only minimal cross state modulation effects. For example and as shown in FIG. 8a, TE and TM state light introduced into a birefringent resonator at a common frequency $F_x$ will be resonantly supported, respectively, at differing spectral spacings as a function of the difference between the ordinary and extraordinary index, as represented by the staggered TE and TM lines. As can be appreciated, the TE and TM state or mode lines will periodically coincide, e.g., at frequencies $F_y$ and $F_z$.

Figure 8B:
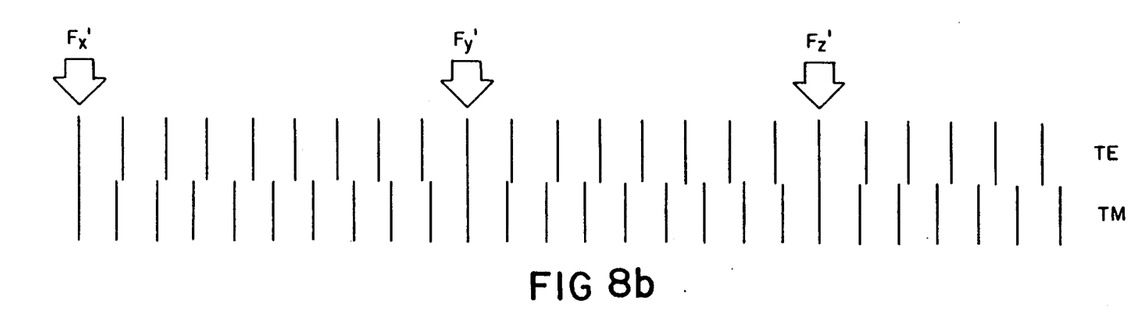
FIG. 8b is a representation of the TE and TM state spectral response at a second temperature for the bus tap resonator of FIG. 5.

When the characteristics of the resonant structures are altered by temperature changes induced by the above-described frequency controllers to cause locking to the system master frequency, the spectral line spacing changes, as shown in FIG. 8b, with TE and TM state coincidence occurring at frequencies $F_{y'}$ and $F_{z'}$.

While the system has been shown in the context of a ring configuration, as can be appreciated, other system structures are possible. For example, all communications channels can be returned to a central point or star for distribution or retransmission to an intended terminal device. If desired, the power output of the central carrier source 14 can be made adaptive, that is, the bus tap resonators of those terminal devices $TD_n$ that are not active can be intentionally detuned to reduce TE state loading on the optical fiber bus 12.

The present invention provides a communications system in which a single source provides a highly stable fixed frequency system wide carrier for use by all terminal devices coupled to the system to dispense with the need for local frequency sources at each terminal device.

Thus, it will be appreciated from the above that as a result of the present invention a highly effective optical communications system is provided by which terminal devices within the system can readily communicate with one another. It will be equally apparent and is contemplated that modification and/or changes may be made in the illustrated embodiment without departure from the invention. Accordingly, it is expressly intended that the foregoing description and accompanying drawings are illustrative of the preferred embodiment only, not limiting, and that the true spirit and scope of the present invention will be determined by reference to the appended claims.

I claim:

1. An optical communications system comprising:
   an optical pathway for propagating light energy, said optical pathway preferentially supporting light propagated in first and second characteristic states, wherein said first and second characteristic states correspond, respectively, to first and second polarization states;
   means for introducing light energy in the first characteristic state onto said optical pathway for propagation thereof; and
   means coupled to said optical pathway for removing optical energy propagated in the first characteristic state, for modulating and shifting the removed light to the second characteristic state, and for returning the modulated and state shifted light at a frequency different from the light introduced in the first characteristic state to said optical pathway for propagation thereon.

2. The optical fiber communications system of claim 1, wherein said first and second polarization states are orthogonal.

3. The optical communications system of claim 1, wherein said first mentioned means introduces light energy onto said optical pathway for propagation in a first direction and said second mentioned means returns modulated and state shifted light to said optical pathway for propagation thereon in a direction opposite to the first direction.

4. The optical communications system of claim 1, wherein said second mentioned means further comprises means for frequency shifting the light returned to said optical pathway.

5. An optical fiber communications system comprising:
   a communication loop defined by a birefringent light guiding optical fiber that preferentially supports light propagated in first and second characteristic states corresponding, respectively, to first and second polarization states;
   means for introducing system wide carrier light in the first characteristic state into said loop for propagation therein wherein said carrier introducing means comprises a light source for generating light at a selected frequency and birefringent resonator means coupled to said light source and said loop for resonantly supporting light in the first state prior to introducing the carrier light into said loop; and
   terminal means coupled to said loop for removing a portion of the carrier light, for modulating and shifting the carrier light to the second characteristic state, and for returning the modulated and state shifted light to said loop for propagation therein.

6. The optical fiber communications system of claim 5, further comprising means coupled to said resonator means for controlling the resonant frequency thereof to coincide with that of said light source.

7. The optical fiber communications system of claim 5, wherein said light source comprises a gas laser.

8. The optical fiber communications system of claim 5, wherein said resonator means comprises a substrate fabricated from a birefringent material having a resonant cavity formed therein.

9. The optical fiber communications system of claim 8, wherein said resonant cavity is formed as a resonant loop.

10. The optical fiber communications system of claim 9, wherein said birefringent material comprises lithium niobate.

11. The optical fiber communications system of claim 6, wherein said resonant frequency controlling means comprises a detector for measuring the light output of said light source not transferred to said loop and for providing a control signal output.

12. The optical fiber communications system of claim 11, wherein said resonant frequency controlling means further comprises a thermal energy generator in a heat conducting relationship with said resonator means for introducing thermal energy thereto to control the resonant characteristics thereof in response to the control signal output of said detector.

13. An optical fiber communications system comprising:
   a communications loop defined by a birefringent light guiding optical fiber that preferentially supports light propagated in first and second characteristic states corresponding, respectively, to first and second polarization states;
   means for introducing system wide carrier light in the first characteristic state into said loop for propagation therein wherein said carrier introducing means comprises:
      a light source for generating light at a selected frequency;
      a birefringent optical transfer link coupled to said light source;
      a resonant cavity structure coupled between said transfer link and said communications loop; and
      means for controlling the frequency of said resonant cavity coupled between said transfer link and said communications loop; and
   terminal means coupled to said loop for removing a portion of the carrier light, for modulating and shifting the carrier light to the second characteristic state, and for returning the modulated and state shifted light to said loop for propagation therein.

14. The optical fiber communications system of claim 13, wherein said means for frequency controlling comprises:
   a detector for measuring the light output of said light source not transferred to said loop and for providing a control signal output; and
   a thermal energy generator in a heat conducting relationship with said resonator means for introducing thermal energy thereto to control the resonant characteristics thereof in response to the control signal output of said detector.

15. An optical fiber communications system comprising:
   a communications loop defined by a birefringent light guiding optical fiber that preferentially supports light propagated in first and second characteristic states corresponding, respectively, to first and second polarization states;
   means for introducing system wide carrier light in the first characteristic state into said loop for propagation therein; and
   terminal means coupled to said loop for removing a portion of the carrier light, for modulating and shifting the carrier light to the second characteristic state, and for returning the modulated and state shifted light to said loop for propagation therein, and wherein said terminal means comprises:
   resonator means for removing a portion of the light propagated in said loop in the first polarized state; and
   modulator means including an electrically responsive birefringent material through which the removed light is passed to effect a state shift and modulation thereof in response to an electrically applied modulation signal.

16. The optical fiber communications system of claim 15, wherein said modulator means comprises a birefringent material substrate bounded by electrodes, and an electrical modulation signal source coupled to said electrodes.

17. An optical fiber communications system comprising:
   a communications loop defined by a birefringent light guiding optical fiber that preferentially supports light propagated in first and second characteristic states corresponding, respectively, to first and second polarization states;
   means for introducing system wide carrier light in the first characteristic state into said loop for propagation therein; and
   terminal means coupled to said loop for removing a portion of the carrier light, for modulating and shifting the carrier light to the second characteristic state, and for returning the modulated and state shifted light to said loop for propagation therein, and wherein said terminal means comprises:
   a resonant cavity structure coupled to said communications loop;
   a birefringent optical transfer link coupled to said resonant cavity structure and having an input/output port;
   modulator means coupled to the input/output port of said transfer link and including an electrically responsive birefringent material through which light is passed to effect a state shift and modulation thereof in response to an electrically applied modulation signal; and
   means for controlling the frequency of said resonant cavity structure coupled between said transfer link and said communications loop.

18. The optical fiber communications system of claim 17, wherein said means for frequency controlling comprises:
   a detector for measuring the light output of said transfer link and for providing a control signal output; and
   a thermal energy generator in a heat conducting relationship with said resonant cavity structure and responsive to said detector for introducing thermal energy thereto to control the resonant characteristics thereof.

19. A method of optically conveying information, comprising the steps of:
   propagating light in a first characteristic state along an optical pathway capable of preferentially supporting optical energy propagated in either a first characteristic state or a second characteristic state corresponding, respectively, to first and second polarization states;
   removing a portion of the first characteristic state light from the optical pathway;
   modulating the removed light with information, shifting the light to the second state and shifting the frequency of the removed light; and
   introducing the modulated and state switched optical energy into the optical pathway for propagation thereon.

20. The method of claim 19, wherein said propagation step further comprises:
   propagating said light in a first direction along said optical pathway and said introducing step further comprises introducing the state shifted light onto said optical pathway in a direction opposite to said first direction.

21. A method of optically conveying information, comprising the steps of:
   propagating light in a first characteristic state along an optical pathway capable of preferentially supporting optical energy propagated in either a first characteristic state or a second characteristic state;

removing a portion of the first characteristic state light from the optical pathway;

modulating the removed light with information and shifting the light to the second state, wherein said modulating and state shifting step further comprises shifting the frequency of the removed light;

introducing the modulated and state switched optical energy into the optical pathway for propagation thereon, wherein said propagation step further comprises propagating said light in a first direction along said optical pathway and said introducing step further comprises introducing the state shifted light onto said optical pathway in a direction opposite to said first direction; and removing a portion of the second characteristic state light and demodulating the removed light to recover the original information signal.

22. An optical fiber communications system comprising:

a communications loop defined by a birefringent light guiding fiber that preferentially supports light propogated in first and second characteristic states corresponding, respectively, to first and second polarization states;

means for introducing system wide carrier light in the first characteristic state into said loop for propagation therein; and terminal means coupled to said loop for removing a portion of the carrier light, for modulating and shifting the carrier light to the second characteristic state, and for returning the modulated and state shifted light to said loop for propagation therein wherein said terminal means returns modulated and state shifted light to said loop at a frequency different from the carrier light introduced by said carrier introducing means.

* * * * *